United States Patent [19]

Szeto et al.

[11] Patent Number: 4,984,613
[45] Date of Patent: Jan. 15, 1991

[54] HINGE MORTISE GUIDE AND CUTTER

[76] Inventors: Danny Szeto; Lin K. Szeto, both of 3165 E. Green St., Pasadena, Calif. 91107

[21] Appl. No.: 458,945

[22] Filed: Dec. 29, 1989

[51] Int. Cl.⁵ ............................ B27F 5/12; B27M 3/00
[52] U.S. Cl. ........................................ 144/27; 33/197; 33/562; 144/144.5 R
[58] Field of Search .................. 33/197, 562; 144/27, 144/144.5

[56] References Cited

U.S. PATENT DOCUMENTS

| | | |
|---|---|---|
| 2,660,803 | 12/1985 | Sacrey . |
| 2,674,280 | 4/1954 | Pierce . |
| 2,821,028 | 1/1958 | Godfrey . |
| 2,869,245 | 1/1959 | Bork . |
| 2,957,507 | 10/1960 | Vargo . |
| 3,150,452 | 9/1964 | Meuwissen .......................... 144/27 |
| 3,150,762 | 9/1964 | Greenley . |
| 3,158,186 | 11/1964 | Heathington ........................ 144/27 |
| 3,184,859 | 5/1965 | Patrick . |
| 3,206,861 | 9/1965 | Damijonaitis et al. . |
| 3,363,487 | 1/1968 | Gohm, Sr. ............................ 144/27 |
| 3,392,762 | 7/1968 | Greenley .............................. 144/27 |
| 3,559,704 | 2/1971 | Thompson . |
| 3,738,013 | 6/1973 | Gregory . |
| 3,789,892 | 2/1974 | Converse et al. ..................... 144/27 |
| 4,553,336 | 11/1985 | Ponce . |
| 4,565,228 | 1/1986 | Ponce . |

FOREIGN PATENT DOCUMENTS 515709 1/1931 Fed. Rep. of Germany ........ 144/27

Primary Examiner—W. Donald Bray
Attorney, Agent, or Firm—Christie, Parker & Hale

[57] ABSTRACT

A mortise guide and cutter for mortising a workpiece is provided. The mortise guide comprises a frame which has a rectangular aperture, means for positioning the frame to engage an edge of the workpiece, and means for attaching the frame to the workpiece. A sizing blade, which is pivotally mounted to the frame, is configured to be selectively rotated from a first position exposing the entire aperture to a second position reducing one dimension of the aperture by the width of the blade.

13 Claims, 3 Drawing Sheets

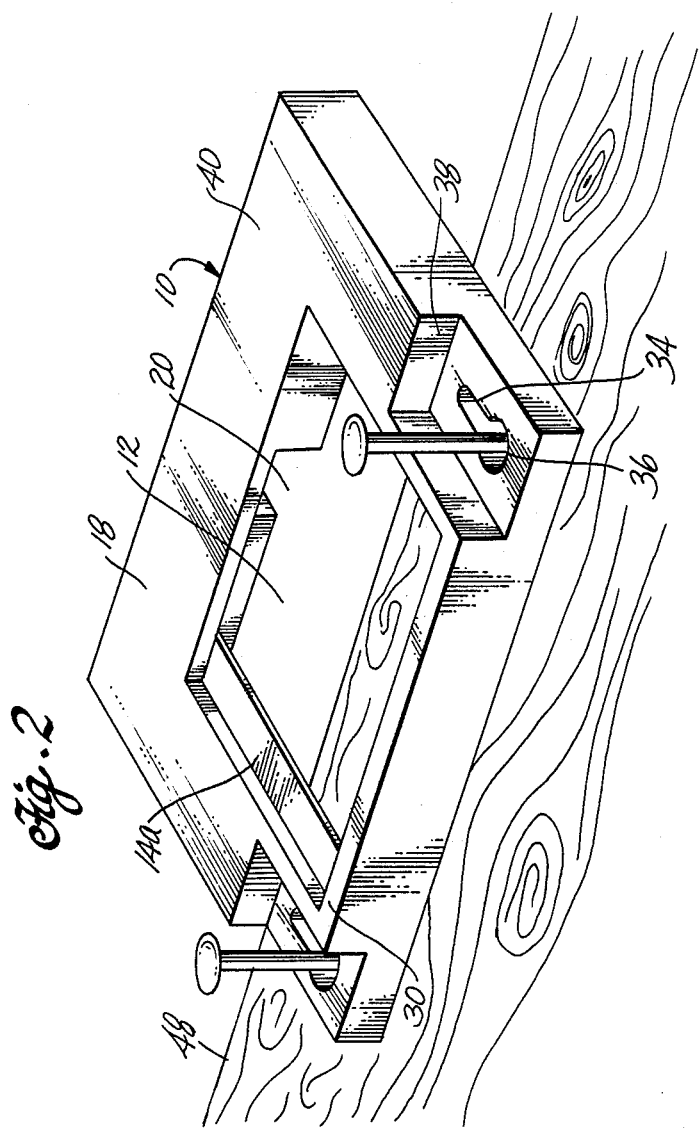

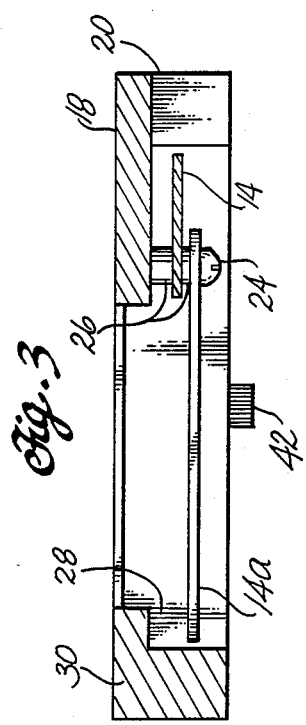
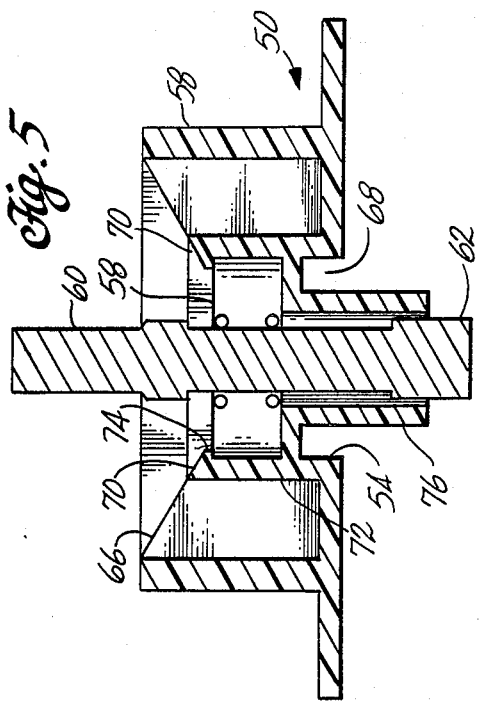
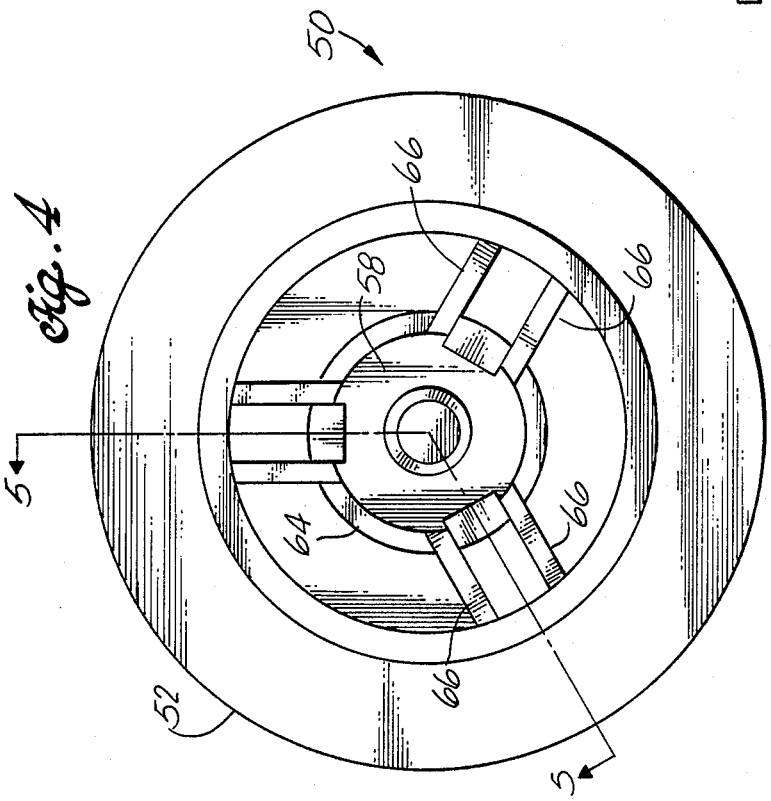

HINGE MORTISE GUIDE AND CUTTER

FIELD OF THE INVENTION

The present invention relates to guides attachable to a door or frame and mating cutters to produce a mortise for receiving a hinge, strike plate or the like. In particular, the present invention provides a mortise guide for attachment to the workpiece, which includes sizing blades rotatably mounted within a template for adjustment of template size and a cutter adapted for use with a standard drill motor and receivable within the template to cut the desired mortise.

BACKGROUND OF THE INVENTION

Cutting a mortise in the edge of a door or in a door frame to receive a hinge is typically accomplished using a chisel, router or other cutting tool. Numerous devices have been designed to increase the accuracy and otherwise simplify cutting of such mortises. The original practice of cutting the mortise with a chisel was first replaced with a box-like device having sharp blades on three of the four edges of the box. This device was then placed with the cutting edges against a door edge or door frame and struck with a hammer, driving the cutting edges into the wood to the desired depth. This provided a clean rectangular cut in the wood which could then be chiseled out with a hand chisel to provide a mortise. A separate box was required, however, for each hinge size.

The use of a router to cut mortises has been enhanced with templates which are attachable to the door edge or door frame. Typically, the templates provide an opening to receive the router blade and by guiding the router blade around the inside of the opening, a mortise may be cut. Examples of such devices are disclosed in U.S. Pat. No. 4,501,308 to Sherman; U.S. Pat. No. 3,392,762 to Greenley; and U.S. Pat. No. 3,150,452 to Meuwissen. These devices provided means for receiving a router to cut a mortise; however, duplicate guides for each size of hinge or striker plate were required. Numerous highly complex devices to provide various size templates within a single structure were devised as exemplified by U.S. Pat. Nos. 3,738,013 to Gregory; 3,559,704 to Thompson; 3,184,859 to Patrick; and 4,553,336 to Ponce. Each of these devices required numerous moving parts and extensive detail machining to accomplish the desired adjustment for various hinge sizes.

SUMMARY OF THE INVENTION

The present invention overcomes the complexity of the prior art devices providing a device which is simple to use and simple to manufacture. The first portion of the invention comprises a cast frame having a central rectangular aperture. One or more sizing blades are pivotally mounted near one corner of the rectangular aperture and swivel from a first position nested in a cut-out or recess in one side of the frame to a second position abutting a second side of the rectangular aperture, thereby decreasing the width of the aperture by the width of the blade. Blades of different widths may be employed to provide various sizing of the aperture, all of the blades commonly mounted at one pivot point. Adjustable engagement means are located on opposite sides of the frame with a plurality of matched positioning holes to engage the edge of the workpiece for proper alignment of the frame. Keyhole apertures located adjacent two corners of the frame allow attachment of the frame to the workpiece using a common nail and allowing the frame to be removed from the workpiece by sliding the frame to position the nailhead in the enlarged portion of the keyhole aperture, which is sized to accommodate the nailhead, thereby allowing the frame to be removed with the nail in place. The nail may then be withdrawn from the workpiece.

The second portion of the invention comprises a cutter holder adapted for engagement in the chuck of a standard drill motor and mating engagement with the rectangular aperture in the frame, the rectangular aperture thereby acting as a template to guide the cutter. The cutter includes a first clear plastic flange having a central aperture. A body extending from the flange and concentrically surrounding the aperture provides a hand grip for manipulating the cutter. Attachment means integral to the body constrain a bearing closely received within the aperture. A shaft captively extending through the bearing provides attachment for the drill motor chuck and terminates in a router bit which extends from the flange opposite the body. A spacer lip or sleeve depends from the flange opposite the body to concentrically surround the router bit. The router bit extends beyond the sleeve to a desired cutting depth for the mortise in the workpiece. The spacer lip engages the sides of the rectangular aperture in the frame to guide the cutter and maintain spacing between the router bit and the frame. The flange is of sufficient size to maintain contact with the top surface of at least three sides of the frame surrounding the rectangular aperture, thereby providing a stable support for the cutter. The foregoing and other advantageous and distinguishing features of the invention are described in detail subsequently and are recited in the appended claims.

BRIEF DESCRIPTION OF THE DRAWINGS

FIG. 2 is a top view of the frame;

FIG. 3 is a cutaway side view of the frame along line 3—3 of FIG. 2;

FIG. 4 is a top view of the cutter; and

FIG. 5 is a side view cutaway of the cutter along line 5—5 of FIG. 4.

DETAILED DESCRIPTION OF THE INVENTION

Figure 1:
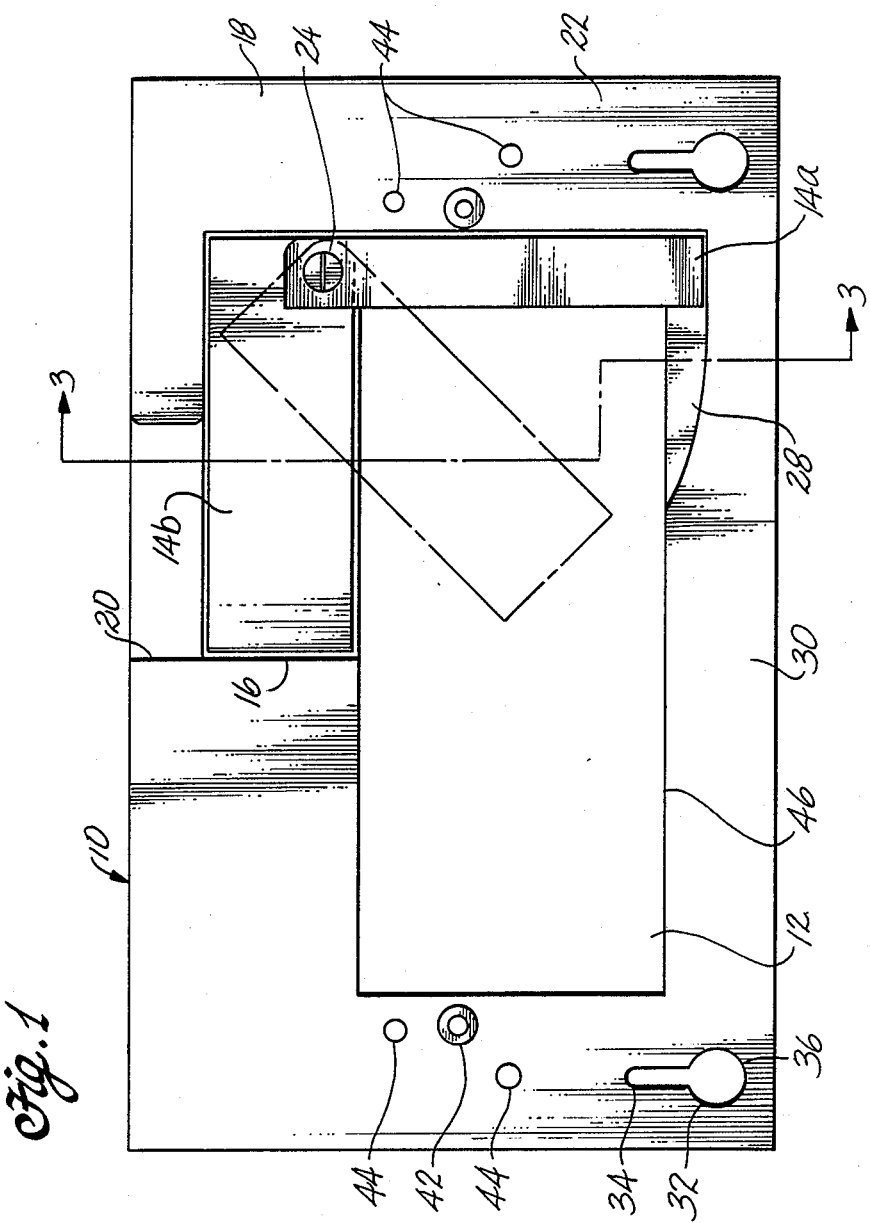
FIG. 1 is a bottom view of the frame demonstrating the sizing bars and workpiece engagement means.

Referring now to the drawings, FIG. 1 shows the first portion of the invention. A frame 10 with a rectangular aperture 12 is provided as a template for the mortise to be cut. Adjustment of the size of the template is accomplished by use of sizing blades 14a and 14b which are pivotally mounted to the frame. A recess 16 in a first side 18 of the frame accommodates the sizing blades in a retracted position. A thumb well 20 allows the user to select the desired blade with his thumb or finger to rotate the blade into position against a second wall 22 of the frame. Only two sizing blades have been shown for clarity; however, those skilled in the art will recognize that multiple blades fo various widths may be employed to provide a series of template sizes.

The sizing blades are pivotally mounted in the recess on a pivot pin 24 as best seen in FIG. 3. Spacing washers 26 are provided between the recess and the first blade and between blades to reduce friction between the blades and the frame for ease of use. The pivot pin may be a headed screw allowing adjustment of the friction on the blades by tightening or loosening the screw. A second recess 28 is provided in a third side 30 of the frame to receive the blade tips. The template for the mortise is thereby maintained without gaps as is best seen in FIG. 2 which shows a top view of the frame with a first sizing blade pivoted into position. With two sizing blades as shown in the drawings, three hinge sizes may be accommodated by the frame as a mortise template. With both blades residing in the recess, the rectangular aperture provides a first template size. With the first blade pivoted into position against the second side of the frame, a second hinge size may be accommodated while pivoting the second blade into place against the second side of the frame allows a third template size.

Those skilled in the art will recognize that placement of recesses of sufficient width and length to accommodate appropriate blades in alternate sides of the frame with appropriate positioning of the pivot for the blades would allow sizing of the template to a plurality of widths and lengths.

Referring again to FIG. 1, the frame is attached to the workpiece by driving a nail through the keyhole apertures 32 and into the workpiece. As shown in FIG. 2, the corners of the third side of the frame are recessed in the region of the keyhole apertures. The shaft of the nail is accommodated by the slot portion 34 of the keyhole for mounting of the frame, which is then held in place by the head of the nail. To remove the frame from the workpiece, the frame is displaced to locate the nailhead in the circular portion 36 of the keyhole aperture, allowing the frame to be lifted off the workpiece. After removal of the frame, the nailhead will be spaced from the workpiece allowing easy removal. The recesses 38 in the corners of the third side prevent interference by the fastening nails with the cutter portion of the invention, which interfaces the top surface 40 of the frame, as will be described in greater detail subsequently.

Positioning of the frame on the workpiece is accomplished with an adjustable positioning means 42 best seen in FIGS. 1 and 3. The positioning means may be a bolt having a flat-sided knurled head or an appropriately sized pin which are placed in matched holes 44 in the bottom of the frame. Positioning of the holes and dimensioning of the adjustment means is accomplished to position the outer edge 46 of the template from the edge of the workpiece 48 to the upper width of the mortise for the hinge size as shown in FIG. 2.

The second portion of the invention is best seen in FIGS. 4 and 5. The cutter 50, adapted for use with the frame previously described, incorporates a flange 52 which interfaces with the top surface of the frame. In the preferred embodiment, the flange is clear plastic or other suitable transparent material to allow the operator to visually observe the relational placement of the cutter with respect to the frame and the cutting of the mortise in the workpiece. The flange contains a central aperture 54. A body 56 extends upwardly from the flange concentrically -surrounding the aperture. The body provides a hand grip for operating the cutter and structural support for other elements of the cutter as will be described subsequently. A bearing 58 is constrained within the cutter to rotationally support a captive shaft 60, which is sized to be received in the chuck of a standard drill motor. The shaft terminates in a router bit 62. The bearing is received in a support ring 64, which is in turn supported from the body by ribs 66.

The bearing is captured by a bottom support 68 extending from the support ring into the aperture which engages a lower surface of the bearing and dogs 70 which engage an upper surface of the bearing. The dogs are resiliently mounted to the flange on upstanding flexible members 72 which may be displaced radially outwardly, allowing displacement of the dogs for insertion of the bearing. The flexible members urge the tips of the dogs 74 over the upper surface of the bearing to engage and constrain the bearing between the dog and the bottom support. A spacer lip 76 depends from the bottom support concentric with the shaft and router bit. The spacer lip engages the sides of the rectangular aperture in the frame to guide the cutter without allowing impact by the bit or shaft on the frame, thereby precluding damage to the frame. The router bit extends below the spacer lip by the desired depth of cut for the mortise.

To operate the present invention, the positioning means are inserted into the matched holes in the bottom of the frame to provide the desired width of mortise for the hinge to be installed. The frame is then mounted to the workpiece by abutting the positioning means against the edge of the workpiece and driving common nails into the keyhole slots to affix the guide to the workpiece. The heads of the nails are driven firmly against the recessed portion of the corners of the frame to frictionally engage the frame preventing displacement. The desired widths of the guide to accommodate the widths of the mortise for the desired hinge is obtained by inserting a thumb or finger into the thumb slot in the frame to pivot the appropriate sizing blade from the first recess into position against the second side of the frame.

The cutter is then attached to a drill motor by inserting the shaft into the chuck. For mortise sizes where the aperture of the frame extends beyond the workpiece, the spacer lip is inserted into the aperture beyond the workpiece, allowing the flange to engage the upper surface of the frame. The diameter of the flange is sufficient to engage free sides of the frame with sufficient surface area to preclude tipping or rocking of the cutter. The drill motor is then started and the router bit is guided using the body of the cutter to create the mortise in the workpiece. The spacer lip may be placed against the sides of the frame to produce the outline cut of the mortise without damage to the frame, since the router bit is maintained in spaced relation from the sides of the aperture by the spacer lip.

Upon completing the cutting of the mortise, the frame may be removed from the workpiece by tapping the frame with a hammer to align the nail heads with the circular portion of the keyhole allowing the frame to be removed from the workpiece. The nails may then be withdrawn from the workpiece with a standard claw hammer or nail puller.

Having now described the invention as required by the Patent Statutes, those skilled in the art will recognize modifications to the embodiment disclosed to accommodate specific requirements. Such alterations or modifications are included within the scope of the invention as described in the following claims.

What is claimed is:

1. A mortise guide and cutter for mortising a workpiece comprising:
   a frame having a rectangular aperture;
   means for positioning the frame comprising means for engaging an edge of the workpiece;
   means for attaching the frame to the workpiece;
   a sizing blade pivotally mounted to the frame the blade having a first position exposing the entire aperture and a second position reducing one dimension of the aperture by the width of the blade, the blade rotatable from the first position to the second position; and means for cutting a mortise.

2. A mortise guide and cutter as defined in claim 1 wherein a first side of the frame includes a recess receiving the blade in the first position.

3. A mortise guide and cutter as defined in claim 2 wherein the first side further contains a thumb well adjoining the first recess whereby a thumb or finger of an operator may be inserted adjacent the recess to swivel the blade from the first position in the recess to the second position.

4. A mortise guide and cutter as defined in claim 3 wherein the frame contains a second recess for receiving a tip of the blade in the second position whereby the aperture with one dimension reduced is maintained without gaps.

5. A mortise guide and cutter as defined in claim 1 wherein the positioning means comprises matched positioning holes in opposing sides of the frame and inserts mountable in said matched holes to engage the edge of the workpiece.

6. A mortise guide and cutter as defined in claim 5 wherein the fastening means comprises keyhole apertures through corner portions of the frame.

7. A mortise guide and cutter as defined in claim 6 wherein a top surface of the frame is recessed proximate the keyhole apertures.

8. A mortise guide and cutter as defined in claim 1 wherein the cutting means comprises a flange for engaging the top surface of the frame, the flange having:

a central aperture, a body extending from the flange concentric to the central aperture, means for constraining within the body a bearing having a captive shaft terminating in a router bit, means for engaging the rectangular aperture of the frame, the engaging means concentrically surrounding the shaft and router bit to prevent contact with the frame.

9. A mortise guide and cutter as defined in claim 8 wherein the engagement means comprises a spacer lip depending through the central aperture in the flange.

10. A mortise guide and cutter as defined in claim 9 wherein the means for constraining the bearing comprises a lower support concentric with the central aperture in the flange for engaging a bottom surface of the bearing, a plurality of members upstanding from the flange spaced circumferentially around the central aperture and terminating in a dog having a lip to engage an upper surface of the bearing, the upstanding members resilient in a radial direction from an axis of the central aperture to allow displacement of the dogs radially outwardly from the axis to receive the bearing during insertion and urging the dogs radially inwardly to engage the upper surface of the bearing.

11. A mortise guide and cutter as defined in claim 3 wherein the sizing blade is mounted to the frame on a pivot pin and further comprises a spacing washer concentric to the pivot pin and mounted between the blade and the frame for reducing and localizing friction force between the blade and the frame, and means for adjusting the friction of the blade and the spacing washer.

12. A mortise guide and cutter as defined in claim 11 wherein the pivot pin comprises a screw having a head constraining the sizing blade and wherein the means for friction adjustment comprises threadable engagement between the screw and the frame whereby tightening the screw forcefully engages the blade between the head of the screw and the spacing washer.

13. A mortise guide and cutter as defined in claim 12 further comprising at least one additional sizing blade having a different width than the first sizing blade.

* * * * *